July 14, 1942. A. D. GRAU 2,289,958
JUICE EXTRACTING DEVICE
Filed Oct. 21, 1940 2 Sheets-Sheet 2
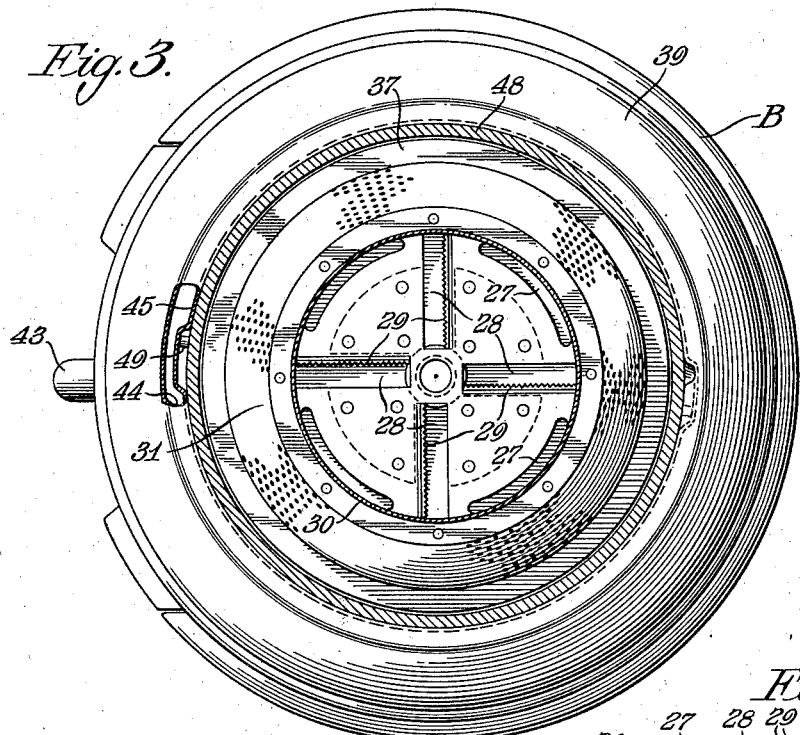
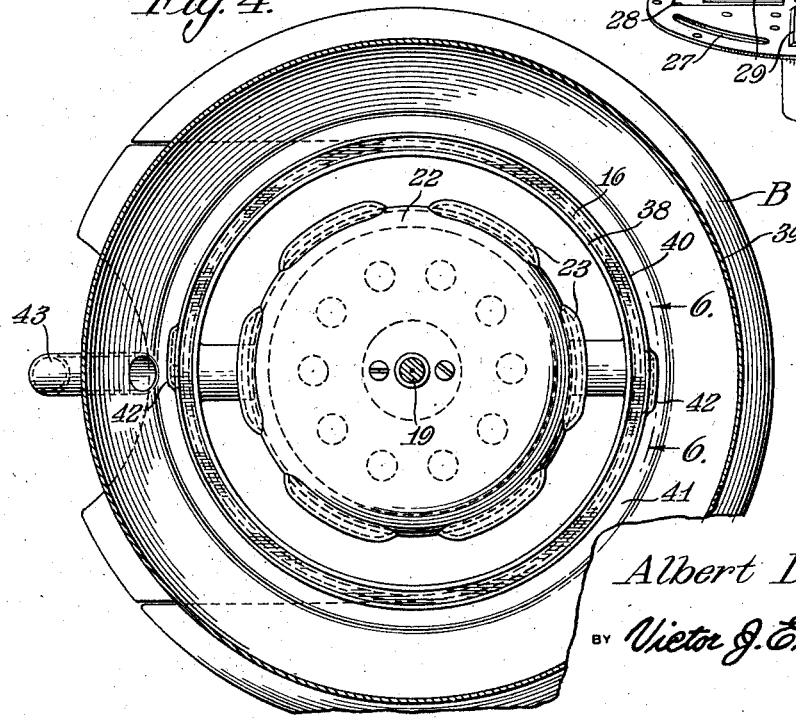
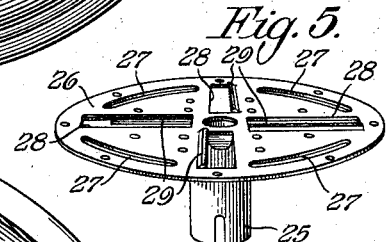
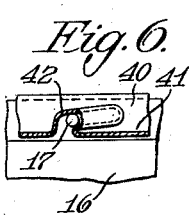
Albert D. Grau.
INVENTOR Patented July 14, 1942

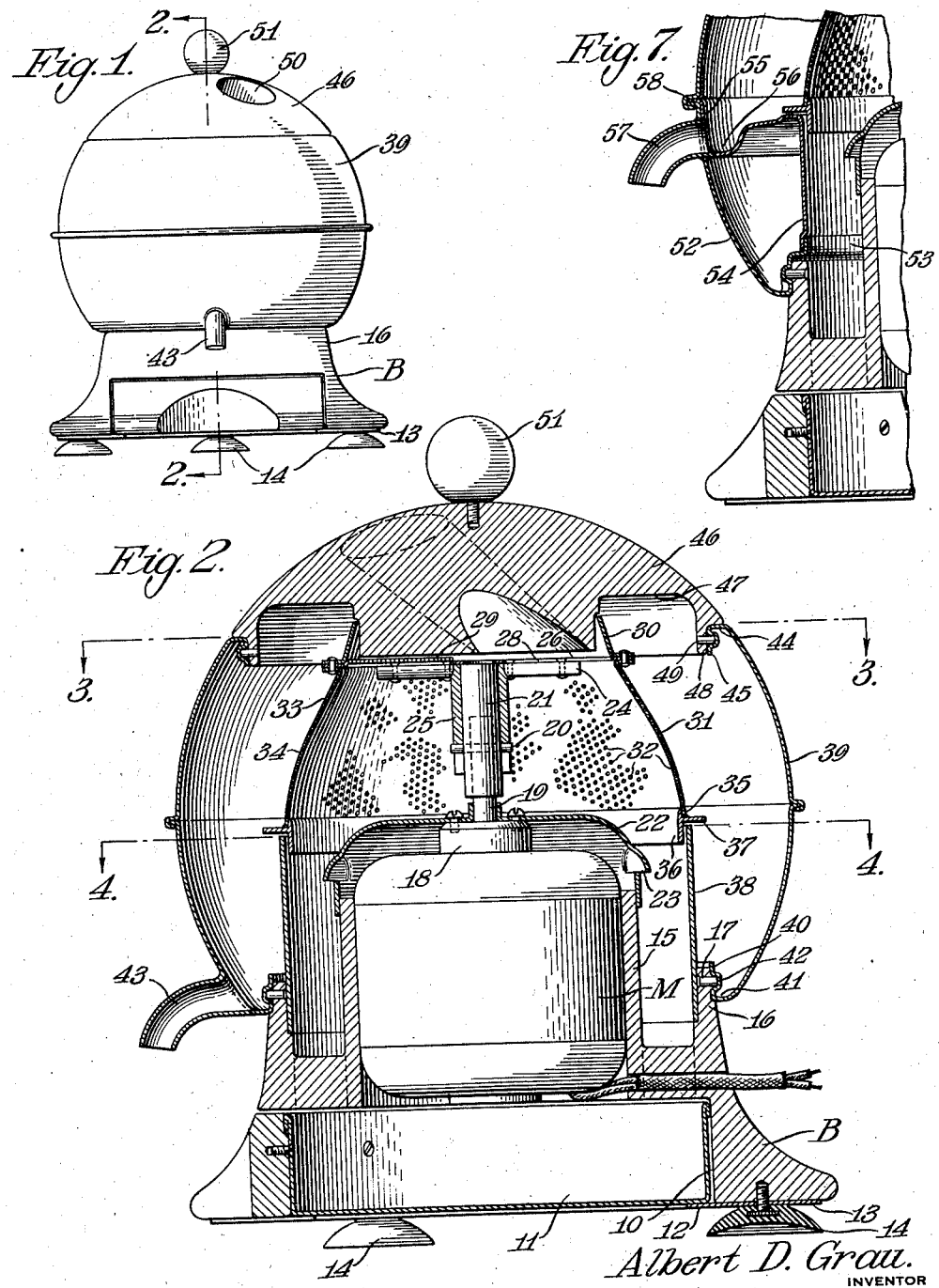

2,289,958

UNITED STATES PATENT OFFICE 2,289,958

JUICE EXTRACTING DEVICE

Albert D. Grau, Tacoma, Wash.

Application October 21, 1940, Serial No. 362,163

4 Claims. (Cl. 146—3)

This invention relates to improvements in juice extracting devices.

A primary object of the invention is to provide a juice extracting device of generally improved design.

Another object of the invention is to provide a device which has high juice extraction efficiency.

A further object of the invention is to provide a device which is convenient to operate and which rapidly extracts the juice from juice containing products.

Still another object of the invention is the provision of a juice extracting device of the aforesaid character which is compact and durable in design.

Other objects and advantages of the invention will become apparent as the description progresses.

In the accompanying drawings forming a part of this specification and in which like numerals are employed to designate corresponding parts throughout:

Figure 1 is a front elevational view of a preferred embodiment of the invention, Figure 2 is an enlarged vertical section taken on line 2—2 of Figure 1, Figure 3 is a transverse section taken along line 3—3 of Figure 2, Figure 4 is a similar view taken approximately along line 4—4 of Figure 2, Figure 5 is a perspective view of the head section of the device, Figure 6 is a fragmentary detail section taken approximately along line 6—6 of Figure 4, and Figure 7 is a fragmentary vertical section through a modified form of the invention.

Referring to the drawings, wherein for the purpose of illustration are shown preferred and modified examples of the invention, B designates an approximately annular base section having a circular chamber 10 in the lower portion designed to slidably accommodate therein a circular pan 11 supported on the protruding flange portion 12 of a plate 13 fastened to the bottom. A plurality of suction cups 14 or the like are also secured to the bottom of the base, as shown at Figures 1 and 2. The upper central portion of the base B is shaped to provide an upstanding cylindrical wall 15 and a concentric exterior flange 16, the latter carrying diametrically opposed protruding pins 17. Within the wall 15 is fitted an electric motor M of conventional construction having a boss 18 about a vertically projecting drive shaft 19 which carries a pin 20 serving to fasten on the shaft a socketed extension 21. Over the motor and the top end of the wall 15 is fitted a cover cap 22 which may advantageously be formed with vent louvers 23.

The shaft assembly supports and drives a head section embodying a flat disk-shaped plate 24 formed at its center with a tubular socket 25 slotted at its lower end for slidable engagement with the shaft extension and the protruding ends of the pin 20. On the top face of the disk 24 is fastened a concentrically positioned cutter plate 26 of enlarged diameter provided with a plurality of arcuate slots 27 and with a plurality of, in the present example four, radial slots 28. A longitudinally extending marginal portion of each of these slots 28 is bent to form an upwardly offset blade 29 serrated along the edge to form cutter teeth, as shown to advantage at Figures 2 and 5.

To the top marginal portion of the head plate 26 is fastened a flanged frusto-conical section 30. To the bottom marginal portion of this plate is secured the upper flanged end of a depending substantially frusto-spherical wall section 31 which may constitute a sheet metal member having closely spaced relatively small apertures 32 throughout the same. This wall section is particularly designed for efficiently expelling juice from juice containing products such as fruit and vegetables by centrifugal force and is shaped so that its upper portion has a tapering configuration, as indicated at 33, merging into a lower portion in the form of a spherical segment 34 which increases in diameter toward the bottom end. Thus, the bottom marginal portion 35 of the perforated wall constitutes the greatest diameter of this member which is curved thereat to approach and nearly assume cylindrical formation. To the bottom edge of this section is secured a cylindrical ring 36 concentric with the axis of the drive shaft and formed with an outwardly directed deflecting flange 37. The lower portion of the ring 36 is disposed in spaced relation within the top of an imperforate cylindrical wall section 38 having its bottom part slidably fitted in a counterbore within the base flange 16.

The exterior of the device embodies an essentially spherical shell 39 having the lower marginal portion bent inwardly and upwardly to form an annular flange 40 defining exteriorly thereof an annular channel 41 constituting a juice collecting well. The flange 40 is shaped to form thereon angular slots 42 adapted to engage the projections of the pins 17 to form a detachable bayonet joint for removably fitting the shell on the base section. A spout 43 at the front of the shell communicates with the well and is disposed to drain the extracted juice from the shell. The top margin of the shell 39 is also bent inwardly and downwardly to form a horizontal seat 44 and a depending annular flange 45.

A cover section 46 of spherical formation, complementary with the contour of the shell, is detachably fitted on the latter, the bottom of the cover having an annular groove 47 defining a depending marginal flange 48 in which are mounted transversely projecting pins 49 engageable with slots in the flange 45 to afford bayonet joints for fastening the cover or top 46 in position. The tapered collar member 30 fits about the center boss of the cover and an inclined bore 50 is formed through the cover section to form a feed port disposed to deposit material in the path of the cutter blades of the head, as best illustrated at Figure 2. For convenient handling of the cover 46 a spherical knob 51 is advantageously connected with the top thereof.

When the machine is in operation, the product from which juice is to be extracted is fed through the inlet port 50 and subjected to cutting action by the raised toothed blades of the rotary cutter head and the particles thus severed pass through the arcuate slots 27 and move downwardly along the interior of the perforated wall 31. As this wall is rotated with the cutter head the particles therein are subjected to centrifugal force which acts to expell the juice through the apertures 32 for collection in the well 41. The upper tapered and lower partially spherical formations of the perforated separator wall are designed so that the juice containing matter initially moves at a relatively rapid rate downwardly along this zone and is retarded as it approaches the lower part of the separator, assuring very efficient extraction of the juice before the residue pulp and other solid matter drops through the annular area between the motor housing and the wall 38 into the receiving pan 11. When circumstances so permit the device may be positioned over a support having an opening substantially registering with the chamber 10 of the base so that the pan 11 may be removed to permit the residue matter to drip into a waste receptacle of relatively large size.

As will be readily apparent the device is constructed and assembled so as to enable rapid and convenient removal of the parts so that the machine may be easily cleaned and maintained in a sanitary condition. With this in mind it will be noted that the cover 46 is detachable from the seat 44 and flange 45 of the exterior shell 39, and that the latter is also removable from the base. The cutter head together with the upwardly projecting collar section 30 and the perforated separating wall 31 is slidably detachable from the motor shaft by merely elevating this assembly therefrom.

A modified form of the device, shown at Figure 7, primarily differentiates from the preferred form hereinbefore described in that the bottom of the shell indicated at 52, is formed with a flange having a stepped upward flange extension 53 to accommodate thereon the lower expanded portion of a cylindrical wall 54. At the upper end of the wall 54 is formed an outwardly directed web structure 55 shaped to form, adjacent its periphery, a channel or well 56 which communicates with a discharge spout 57 extended through an aperture in the medial portion of the shell 52 and communicating with the well to drain the juice therefrom. A horizontally projecting flange 58 on the web 55 may be firmly secured by crimping the same in a joint connecting the upper and lower sections of this shell. This affords an elevated spout arrangement which may be most convenient in some cases.

It is to be understood that the forms of my invention herewith shown and described are to be taken as preferred and modified examples of the same and that various changes relative to the material, size, shape and arrangement of parts may be resorted to without departing from the spirit of the invention or the scope of the subjoined claims.

Having thus described my invention, I claim:

1. In a juice extracting device, a circular base having a pair of upstanding cylindrical wall sections arranged in spaced apart concentric relation, the said base being formed to provide through passages between the inner and outer of the said walls, a motor mounted within the said inner cylindrical wall having an upstanding drive shaft, a cutter head secured on the said shaft and disposed horizontally at the top thereof, an annular perforated pulp and juice separating wall connected with the periphery of the cutter head and depending therefrom, the said separating wall having a lower marginal portion depending within and adjacent to the upper marginal portion of the outer cylindrical base wall for guiding pulp between the concentric base walls and through the base into a receiving receptacle the said cutter head having openings for the passage of pulp and juice to the interior of the separating wall, an exterior shell secured on the base and adapted to collect juice expelled through the perforated wall and having a juice discharge passage, and a cover having a passage for feeding material to and through the said cutter head.

2. In a juice extracting device, a circular base having a pair of upstanding cylindrical wall sections arranged in spaced apart concentric relation, the said base being formed to provide through passages between the inner and outer of the said walls, a motor mounted within the said inner cylindrical wall having an upstanding guide shaft, a cutter head secured on the said shaft and disposed horizontally at the top thereof, an annular perforated juice and pulp separating wall connected with the periphery of the cutter head and depending therefrom, the said separating wall having a lower marginal portion depending within and adjacent to the upper marginal portion of the outer cylindrical base wall for guiding pulp between the concentric base walls and through the base into a receiving receptacle the said cutter head having openings therein for the passage of pulp and juice into the interior of the separating wall, an exterior shell secured on the base and adapted to collect juice expelled through the perforated wall and having a juice discharge passage, and a cover removably mounted on the shell and having a feed passage therethrough whereby material from which the juice is to be extracted may be fed to the cutter head and dropped therefrom into the perforated wall portion of the device.

3. In a juice extracting device, a circular base having a pair of upstanding cylindrical wall sections arranged in spaced apart concentric relation, the said base being formed to provide through passages between the inner and outer of the said walls, a motor mounted within the said inner cylindrical wall having an upstanding guide shaft, a cutter head secured on the said shaft and disposed horizontally at the top thereof, an annular perforated juice and pulp separating wall connected with the periphery of the cutter head and depending therefrom, the said separating wall having a lower marginal portion depending within and adjacent to the upper marginal portion of the outer cylindrical base wall for guiding pulp between the concentric base walls and through the base into a receiving receptacle, an exterior shell secured on the base and adapted to collect juice expelled through the perforated wall and having a juice discharge passage, the said cutter head having upwardly projecting cutting elements and openings therein for the passage of material through the head and into the perforated wall section of the device, and a cover section removably mounted on the top of the shell having a feed passage therethrough for feeding material to and through the said cutter head.

4. In a juice extracting device, a circular base having a pair of upstanding cylindrical wall sections arranged in spaced apart concentric relation, the said base being formed to provide through passages between the inner and outer of the said walls, a motor mounted within the said inner cylindrical wall having an upstanding guide shaft, a cutter head secured on the said shaft and disposed horizontally at the top thereof, an annular perforated juice and pulp separating wall connected with the periphery of the cutter head and depending therefrom, the said separating wall having a lower marginal portion depending within and adjacent to the upper marginal portion of the outer cylindrical base wall for guiding pulp between the concentric base walls and through the base into a receiving receptacle, an exterior shell secured on the base and adapted to collect juice expelled through the perforated wall and having a juice discharge passage, the said cutter head having upwardly projecting cutting elements and openings therein for the passage of material through the head and into the perforated wall section of the device, a cover section removably mounted on the top of the shell having a feed passage therethrough for feeding material to and through the said cutter head, and an annular wall section secured to the periphery of the cutter head and extending upwardly therefrom and surrounding the central feed portion of the cover.

ALBERT D. GRAU.